Patented Feb. 24, 1953　　　　　　　　　　　　　　　　　　　　　　　　　　　　　　　　2,629,719

UNITED STATES PATENT OFFICE 2,629,719

AMINOALKYL THIOXANTHENE OXIDES AND THE PRODUCTION THEREOF

John W. Cusic, Skokie, Ill., assignor to G. D. Searle & Co., Skokie, Ill., a corporation of Illinois No Drawing. Application June 6, 1947, Serial No. 753,049

5 Claims. (Cl. 260—328)

This invention relates to compositions of matter having the general structural formula

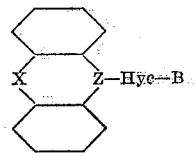

wherein X is an oxygenated sulfur group, Z is a trivalent group such as N or CH, Hyc is a bivalent non-aromatic hydrocarbon radical, and B is an aliphatic-type amino radical, and to processes for preparing the same.

In the compounds of the above formula, Hyc may represent an alkylene radical such as ethylene, propylene, trimethylene, tetramethylene, and the butylene and amylene radicals. The hydrocarbon chain may be branched or straight. It may carry aromatic or alicyclic substituents or it may be part of a carbocyclic or heterocyclic system. As used herein, alkylene radical represents a bivalent radical derived from a saturated aliphatic hydrocarbon.

The aliphatic-type amino radical B represents secondary and tertiary aliphatic amino groups, such as mono- and dialkyl amino radicals wherein the alkyl radicals may be the same or different, and related aliphatic atertiary amines. It represents aliphatic-type heterocyclic amino radicals such as morpholino, piperidino, pyrrolidino, thiomorpholino, and C-alkylated derivatives of such radicals. B is derived from strong organic secondary and tertiary amines having ionization constants in the range of $10^{-3}$ to $10^{-6}$.

The oxygenated sulfur grouping, X, represents the sulfoxide or sulfinyl grouping, SO, and the sulfone or sulfonyl grouping, $SO_2$. The trivalent grouping, Z, represents trivalent nitrogen or a methine group, CH.

The compounds which comprise my invention are useful as chemical intermediates, as vulcanization accelerators, as therapeutic and pharmaceutical compositions, and as dye intermediates. The compounds may be used in the form of free bases or may be converted to some suitable salts with organic or inorganic acids or by formation of quaternary ammonium compounds. Among the acids which are satisfactory for salt formation are organic acids such as citric, acetic, oxalic, tartaric, lactic, maleic, malic, phenylacetic, cinnamic, and the like. Inorganic acids are generally suitable, especially the halogen acids and mineral acids. For the formation of quaternary ammonium salts, aralkyl and alkyl halides, sulfonates and sulfates are suitable, and alkyl and aralkyl chlorides and bromides are preferred. The compounds are equally useful whether in the form of their salts or as free bases. It is understood that the appended claims are directed to both the free bases and salts thereof.

The compounds of this invention can be prepared by the aminoalkylation of a compound having the formula

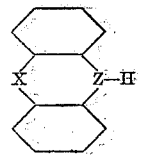

wherein X and Z represent the groups disclosed hereinabove. This reaction is preferably carried out by forming an alkali metal derivative in the 10-position of the cyclic compound and treating this organometallic derivative with an aminoalkyl halide, generally in the presence of an inert solvent. However, the compounds may also be prepared from a 10-halo-alkyl derivative of the formula

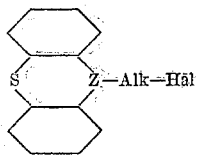

wherein Z has the meaning given hereinabove, Alk is an alkylene radical and Hal is halogen, by oxidation of the sulfide linkage by known procedures to sulfinyl or sulfonyl derivatives, employing oxidizing agents such as peracetic acid, hydrogen peroxide, permanganate and related oxidizing agents. The oxidized substance thus obtained is subsequently treated with a primary or secondary aliphatic or aliphatic-type amine with the resultant formation of the desired compound to which this invention relates. Furthermore, a compound of the formula

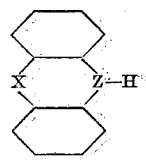

wherein X and Z represent the groupings hereinabove disclosed, may be converted by haloalkylation to the corresponding 10-haloalkyl compound, using a dihalide such as ethylene chlorobromide or trimethylene chlorobromide with the alkali metal derivative of the cyclic compound. The 10-haloalkyl derivatives thus obtained are subsequently converted to 10-aminoalkyl derivatives by the foregoing procedure.

My invention is further illustrated by the following examples, which are not to be construed in any way as limiting it in spirit or scope.

*Example 1*

A solution of butyllithium is prepared from 92.5 grams of n-butyl chloride, 14 g. of lithium and 1 liter of dry ether. To it is added in 2 hours 179 g. of phenothiazine. A vigorous reaction occurs, with the formation of a light yellow solution, and cooling is required. A solution of 211 g. of beta-chloroethyl p-toluenesulfonate in 200 cubic centimeters of dry ether is added in 1 hour. The reaction mixture is left overnight, then cooled and treated with water. Additional ether is added to dissolve the organic material. The ether is separated and washed. Evaporation of the ether leaves a crystalline residue of 10-(beta-chloroethyl)phenothiazine which melts at 95–96° centigrade after recrystallization from alcohol.

A solution of 64 g. of 10-(beta-chloroethyl)-phenolthiazine in 2400 cc. of alcohol is stirred and warmed while 250 cc. of 25% aqueous hydrogen peroxide is added dropwise. The reaction mixture is left for two days and then poured into water containing a small amount of hydrochloric acid. The precipitate of 10-(beta-chloroethyl)phenothiazine oxide is filtered and recrystallized from a mixture of petroleum ether and benzene, and melts at 152–153° C.

A solution of 27 g. of the oxide of 10-(beta-chloroethyl)phenothiazine in 150 cc. of hot methyl ethyl ketone is reacted at about 60–65° C. for a long period of time with 9 g. of dimethylamine and 1 g. of potassium iodide. After about 9 days the solvent is evaporated and dilute hydrochloric acid and ether are added to the residue. The acid layer is removed, made alkaline and extracted with ether. The ether extract is dried with potassium carbonate, and on chilling 10-(beta-dimethylaminoethyl)phenothiazine-5-oxide crystallizes out; melting point 132–133° C. The hydrochloride, after recrystallization from isopropanol, melts at 225–226° C. and has the formula:

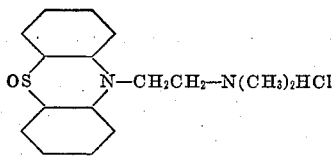

*Example 2*

A solution of butyllithium in ether is prepared from 27.7 g. of n-butyl chloride and 5 g. of lithium. This is converted to the lithium derivative of thioxanthene dioxide by the addition of 31 g. of thioxanthene dioxide. To the resulting solution is added 21.4 g. of beta-dimethylaminoethyl chloride with stirring and chilling. After the reaction is complete the solution is treated with dilute hydrochloric acid. A solid precipitate of unreacted thioxanthene dioxide separates out and is filtered off. The filtrate is made alkaline and the ether layer is separated, dried and evaporated. The residue of 10-(beta-dimethylaminoethyl)thioxanthene-5-dioxide is distilled at 240–245° C. at 2–3 mm. The distillate so obtained is dissolved in benzene and dry ether. The addition of alcoholic hydrogen chloride gives a precipitate of the hydrochloride which, after recrystallization from isopropanol, melts at 253–255° C., and has the formula:

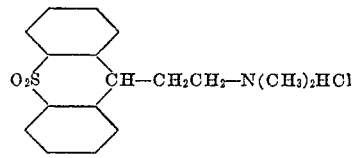

*Example 3*

10 g. of 10-(beta-chloroethyl)phenothiazine oxide in 50 cc. of methyl ethyl ketone is warmed to 60–65° C. for several days with 4 g. of diethylamine and 0.5 g. of potassium iodide. After evaporation of the solvent, the residue is taken up in dilute hydrochloric acid. The acid solution is extracted thoroughly with ether to remove non-basic substances. It is then made alkaline with an excess of dilute alkali and then extracted with ether. This extract is dried and evaporated. The residue is nearly pure 10-(beta-diethylaminoethyl)phenothiazine-5-oxide, which has the formula

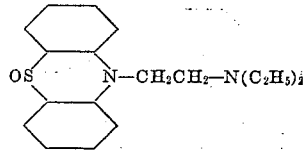

*Example 4*

A solution of n-butyllithium in dry ether (prepared from 5 g. of lithium) is reacted with 28.8 g. of thioxanthene oxide. The resulting organo-lithium complex is treated with a solution of 24.4 g. of gamma-dimethylaminopropyl chloride in dry ether with stirring and cooling. After the reaction is complete, the charge is treated with dilute acid and filtered. The filtrate is made basic and the ether layer removed, washed and dried. From it is obtained on evaporation 10-(gamma-dimethylaminopropyl)-thioxanthene-5-oxide, which has the formula

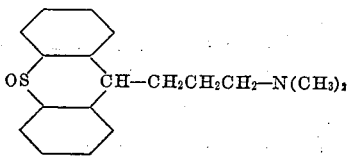

*Example 5*

A suspension of 13.9 g. of phenothiazine dioxide, 9 g. of beta-dimethylaminopropyl chloride hydrochloride, 8 g. of powdered sodium hydroxide in 100 cc. of dry toluene is agitated at 95–100° C. for 6 hours. The reaction mixture is then filtered and the filtrate is extracted with dilute mineral acid. The acid extract is made basic and extracted with benzene. The benzene extract is washed, dried and evaporated, affording 10-(beta-dimethylaminopropyl)phenothiazine-5-dioxide, which has the formula

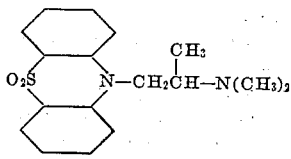

*Example 6*

A solution of the lithium derivative of thioxanthene dioxide is prepared from 15 g. of thioxanthene dioxide by the method of Example 2. To it is added with stirring and cooling a solution of 17.4 g. of beta-piperidinobutyl chloride in dry ether. The reaction mixture is worked up by addition of dilute acid, filtration, alkalization of the filtrate and separation of the organic layer. This layer is washed, dried, evaporated and distilled under reduced pressure. There is thus isolated 10-(beta-piperidinobutyl) thioxanthene-5-dioxide, which has the formula

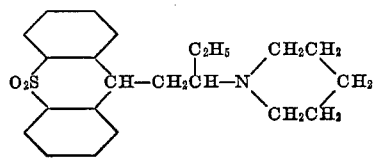

*Example 7*

A solution of 50 g. of 10-(beta-chloroethyl)-phenothiazine-5-monoxide in 300 cc. of methyl ethyl ketone is heated under pressure at about 100° C. with 20 g. of ethylamine in the presence of 2 g. of potassium iodide. After several days the solvent and volatile substances are removed by evaporation. The basic material is extracted with dilute mineral acid and the extract is washed with ether, made basic and extracted with ether. Removal of the ether gives 10-(beta-ethylaminoethyl)phenothiazine-5-oxide, which has the formula

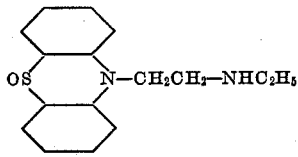

By treatment of the above secondary amine with ethylene dichloride or with ethylene chlorohydrin, the corresponding 10-[beta-(beta-chloroethyl)ethylaminoethyl]-phenothiazine-5-oxide and 10-[beta-(beta-hydroxyethyl)-ethylaminoethyl]phenothiazine-5-oxide are obtained.

I claim:

1. A member of the group consisting of a 10-(dialkylaminoalkyl)thioxanthene-5-oxide having the structural formula

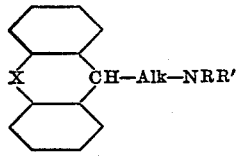

wherein X is an oxygenated sulfur group, Alk is a lower alkylene radical and R and R' are lower alkyl radicals, and salts thereof.

2. A 10-(dimethylaminoalkyl)thioxanthene-5-oxide having the structural formula

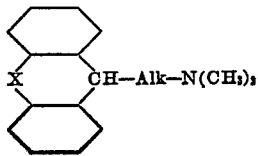

wherein X is an oxygenated sulfur group and Alk is a lower alkylene radical.

3. A 10-(dimethylaminoethyl)thioxanthene-5-oxide having the structural formula

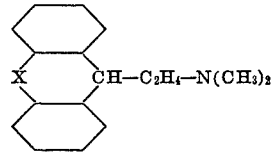

wherein X is an oxygenated sulfur group.

4. 10-(beta-dimethylaminoethyl)thioxanthene-5-dioxide, which has the structural formula

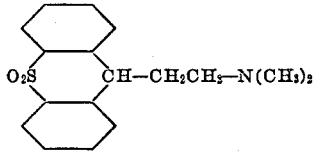

5. The process of preparing a compound of the structural formula

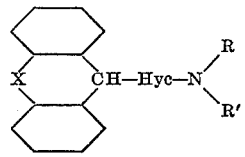

wherein X is an oxygenated sulfur radical, Hyc is a lower bivalent aliphatic hydrocarbon radical, and R and R' are lower alkyl radicals, which comprises reacting an alkali metal derivative of a compound having the formula

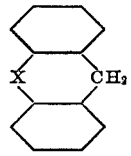

with an aminoalkyl halide of the formula

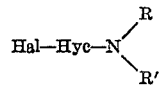

wherein Hal is halogen, and separating the basic compound thus formed.

JOHN W. CUSIC.

REFERENCES CITED

The following references are of record in the file of this patent:

UNITED STATES PATENTS

| Number | Name | Date |
|---|---|---|
| 2,368,006 | Cusic | Jan. 23, 1945 |

OTHER REFERENCES

Viaud, Produits Pharmaceutiques, 2, pages 60, 61 (Feb. 1947).

Huttrer, Enzymologia, vol. 12, pp. 287-288 (1948) (abstract of P. Viaud, Produits pharmac. France 2/2 53-64 (1947).

Gilman et al., Jour. Am. Chem. Soc., 66, 888-892 (1944).